Jan. 10, 1967 J. SCHOENIKE Re. 26,140

COLLAPSIBLE ICE SHELTER

Original Filed July 21, 1961 2 Sheets-Sheet 1

JOHN SCHOENIKE,
INVENTOR.

BY John T. Mann

ATTORNEY

Jan. 10, 1967 J. SCHOENIKE Re. 26,140

COLLAPSIBLE ICE SHELTER

Original Filed July 21, 1961 2 Sheets-Sheet 1

JOHN SCHOENIKE,
INVENTOR.

BY

ATTORNEY

United States Patent Office

Re. 26,140
Reissued Jan. 10, 1967

26,140
COLLAPSIBLE ICE SHELTER

John Schoenike, 147 8th St., Clintonville, Wis. 54929

Original No. 3,157,185, dated Nov. 17, 1964, Ser. No. 125,819, July 21, 1961. Application for reissue Oct. 24, 1965, Ser. No. 505,078
11 Claims. (Cl. 135—4)

Matter enclosed in heavy brackets [ ] appears in the original patent but forms no part of this reissue specification; matter printed in italics indicates the additions made by reissue.

This invention relates to portable, collapsible shelters and more particularly to such shelters intended for use in ice fishing and transportable by a manually drawn sled.

Fishing through ice in the Northern United States has, for many years, been a popular sport engaged in by many people. To provide escape from the sometimes disagreeable effects of the weather while fishing, it has often been the practice of these anglers to construct a shelter of some type. These shelters have generally been heavy and cumbersome to move and are, therefore, positioned at one place for an entire winter. However, with the enactment of recent laws requiring removal of these sehlters at night together with the desire of the fisherman to move easily from place to place on one lake or even to move to a different lake, the invention of a new and different concept of shelter has evolved.

It is an important object of my invention to provide a lightweight, collapsible frame shelter having a windproof cover which will be extremely rigid when erected and yet be foldable into compact unit for transportation from place to place.

It is also an important object of my invention to provide a collapsible shelter having an extendable side which when extended, will increase the inside dimensions of the erected shelter over those of the structure when it is folded and where a part of the cover extends out over an area of ice.

It is also an important object of my invention to provide collapsible fishing shelter mounted on a base having ground contacting runners or skis such that the unit may easily be pulled from one location to another with a minimum of effort.

A further object of my invention is to provide collapsible shelter having a door at one end thereof to allow entrance to the structure while it is being erected.

Other objects and advantages of the invention will be understood from the following description and claims in conjunction with the accompanying drawings which show by way of example preferred embodiments of the invention and in which:

Figure 1:
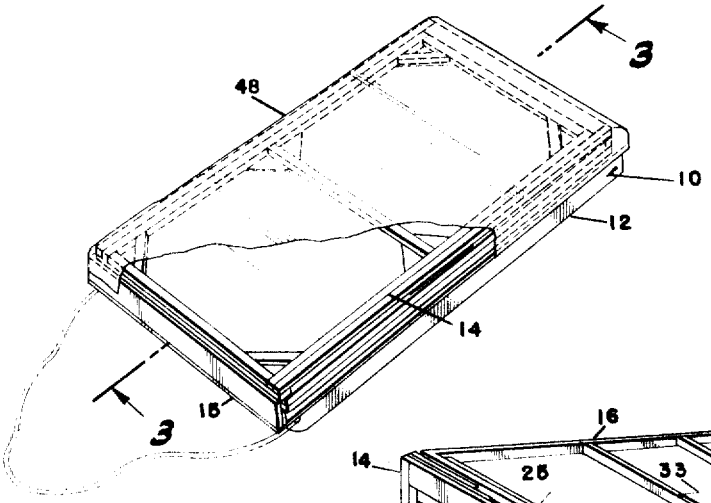
FIG. 1 is a perspective view of my invention in a collapsed or folded position with a flexible cover broken away to disclose the frame sections.

Referring now to the detail drawings, a sled, generally indicated by the numeral 10, is provided with a flat, continuous floor or platform 11 which may be rectangular or square in plan outline. Platform 11 is supported by a pair of runners 12 which are integrally fastened thereto, it being understood that two runners are deemed the minimum number required for practical operation but that more than two could also be used.

The upper surface of platform 11 is bounded on three sides by a platform frame 13 consisting of a front member 15, a side member 35 and a rear member 36 and is securely fastened to said platform. While I deem it best to omit a frame member from a platform edge parallel to the sled runners 12, it can be seen that my invention could also function properly if one of the transverse platform edges were open.

Figure 2:
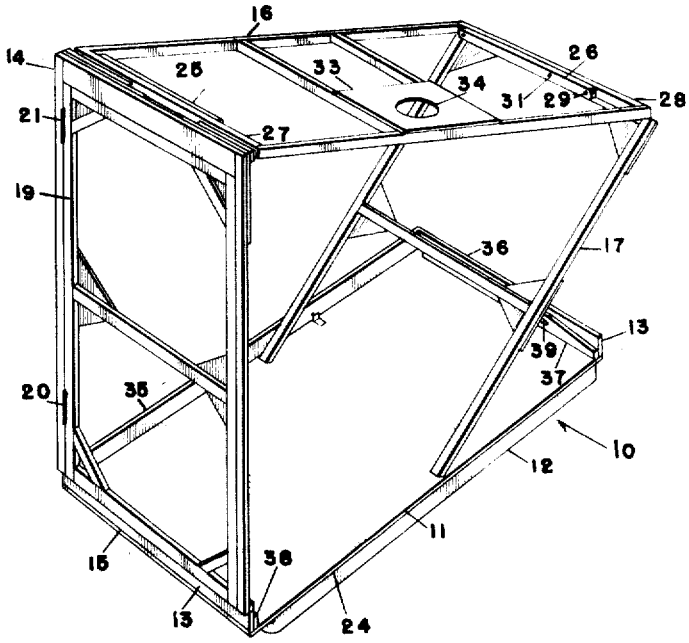
FIG. 2 is a perspective view of the structure of the shelter in a partially erected state.
Figure 4:
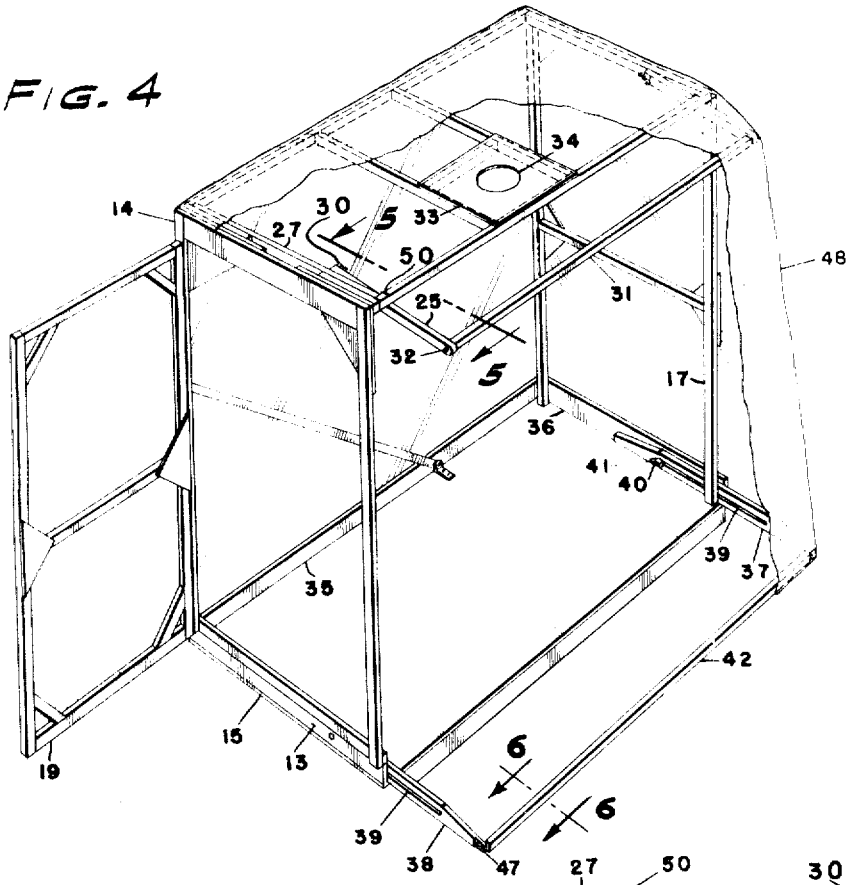
FIG. 4 is a perspective view of the invention after it has been fully erected with a breakaway of the windproof cover to more clearly show the structural elements of the frame.
Figure 7:
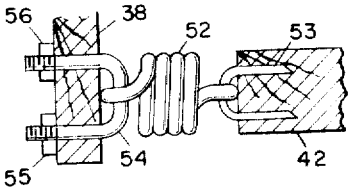
FIG. 7 is a fragmentary section taken on vertical plane 6—6 of FIG. 4 showing a spring expandible member.
Figure 6:
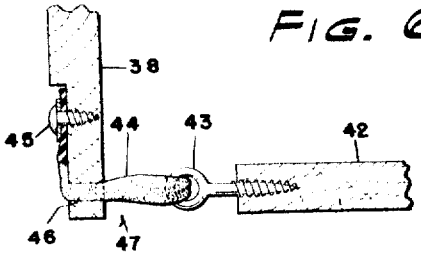
FIG. 6 is a fragmentary section taken on vertical plane 6—6 of FIG. 4.

End extension members 38 and 37 lie immediately adjacent front frame member 15 and rear frame member 36 respectively and are each provided with a longitudinally extending slot 39. A bolt 40 integral with the frame ends projects through the aforesaid slots and allows the extensions 37 and 38 to be retracted and extended as shown in FIGS. 2 and 4. A tightening means such as a wing nut 41 is also provided so that the said extensions may be locked in any position of their travel. Other locking methods could be used here such as a cam toggle bolt, a spring biased washer or a bolt threaded into the frame end members and I do not wish to be limited by the construction shown. Bottom side bar 42 extends between the outermost ends of extensions 37 and 38 and is secured thereto with expandible joint 47. FIG. 6 shows a preferred embodiment of this point wherein a strip of elastomeric material 44, such as natural or synthetic rubber, is fastened to the outer end of the extension 38 with a fastener such as woodscrew 45. Material 44 then passes consecutively through bore 46 in extension 38 and eye bolt 43 in the end of side bar 42, hence back through bore 46, and is secured by woodscrew 45. Another method of providing an expandible joint would be the use of a coil spring between the two members as shown in FIG. 7. Therein coil spring 52 is held to extension 38 by a U-bolt 54 secured by nuts 55 and 56 and is fastened to side bar 42 by staple 53.

Figure 3:
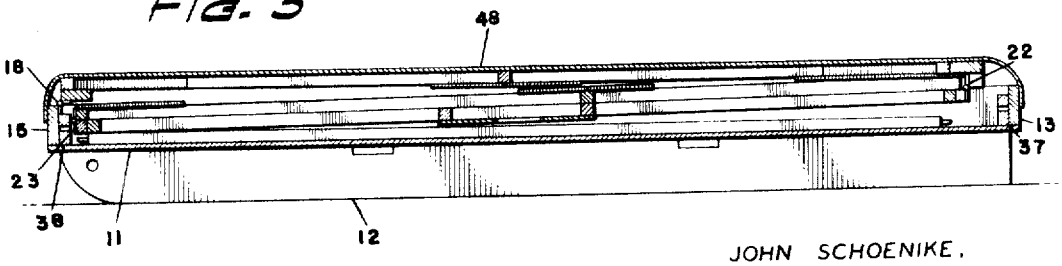
FIG. 3 is a longitudinal cross section of the invention taken on line 3—3 on FIG. 1.

A collapsible structure of my shelter consists of a first or door frame section 14, a second or roof frame section 16, and a third or wall frame section 17. Door frame section 14 is connected to front member 15 of platform frame 13 with hinge 18, said hinge and said front member being located and proportioned to allow roof frame section 16 and wall frame section 17 to nest between said door frame section and platform 11 as shown in FIG. 3. Door frame section 14 is also provided with a door 19 which is preferably covered with a windproof material such as canvas or polyethylene plastic as shown in FIG. 4. Hinges 20 and 21 allow this door to open outwardly for easy entrance and exit from the shelter and aids greatly during the setting up of the structure by permitting access to the interior of the structure. The preferred embodiment of my invention provides for mounting door 19 such that its frame elements are flush with the outer members of the door frame section itself. It can be seen that other methods of door mounting could be used without detracting from the successful function of my invention.

The forward end of roof frame section 16 is hinge connected to the top of door frame section 14 at 22 as shown in FIG. 3 and to the top of wall frame section 17 at 23. The front and rear end members 27 and 28, of roof frame section 16 are each provided with top arms, 25 and 26, respectively, said arms being in pivotal connection with the front and rear end members at 29 and 30. The pivot means is tightenable.

Figure 5:
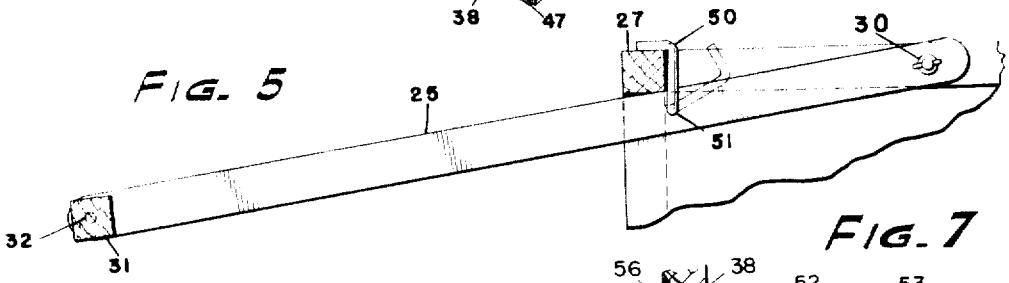
FIG. 5 is a view taken on vertical plane 5—5 of FIG. 4.

Arms 25 and 26 are shown in their folded positions in FIG. 2 and are extended to the positions shown in FIG. 4 by swinging them downwardly and up into contact with frame 16. FIG. 5 shows clearly the method used to retain the arms in their extended positions. Herein a multi-bend Z-latch 50 is rotatable in arm hold 51 and is adapted to engage the roof frame section 16. While this method of fastening arms 25 and 26 in their extended positions has proved economical and effective it can be seen that many other methods of latching could be used, and I do not wish to be limited by the embodiment disclosed herein. A top cross bar 31 joins the outer ends of arms 25 and 26 and is secured thereto respectively by pinned connections 32. A heat resistant plate 33 having a hole 34 to receive a chimney pipe may be placed in the roof frame section if a heating stove is desired for the shelter. It would also be possible to place this chimney pipe exit plate in the wall frame section 17 without impairing the function of same.

Both the door frame section 14 and the roof frame section 16 consist basically of a pair of equal length parallel members joined at each end by cross member, while the wall frame section can have one end cross member and a second cross member at any point along the sides which will provide adequate rigidity. As can be seen in the figures reinforcing members can be placed across the frame corners as required to improve rigidity. The presence of this reinforcing will be dependent on the method of frame construction, i.e. welded, pinned, riveted, etc. While the drawings herein show the frame work constructed from square and rectangular members it can be seen that tubular frame elements could also be used successfully in making my invention.

In use my ice shelter would be carried to a fishing area such as a frozen lake or river, for example, in the trunk of a car, removed therefrom and pulled to some selected fishing spot. A hole or holes would then be bored through the ice and the shelter placed beside them.

After removing cover 49, the foldable portion of the shelter structure consisting of the door frame section 14, the roof frame section 16 and the wall frame section 17 would be raised to a vertical position, the door 19 opened and the folded roof frame section and wall frame section pushed backwardly. The roof frame section 16 then assumes its normal horizontal position and wall frame section swings to the vertical such that its lower end contacts platform 11 and is contiguous to end member 36 and extension 37. The sequence of the unfolding phases of erection are clearly shown in FIG. 2. Covering 48 is fastened to the outer periphery of frame 13 along side member 35 and end member 36 and also along the side and top edges of door frame section 14. While I prefer to have this cover permanently affixed to the shelter frame work in the manner described it can be carried separately and placed over the frame work after it has been erected. The covering preferably consists of a wind-proof material which can be either transparent, translucent or opaque. Canvas, mylar and polyethylene are examples of suitable covering materials.

When the three frame sections are in place the frame extensions 37 and 38 are pushed into place. It can be seen that the expandible joints between the lower side bar and the extensions permit one extension member at a time to be pushed out. As one extension member reaches the full extent of its outward travel the distance between the outer ends of the front and rear extension members is greater than when both such members are out. Thus the expandible joint 47 compensates for this added distance without producing a structure distortion. The pivoted top arms 25 and 26 are now swung into the positions shown in FIG. 4 and held in place with latches 50. A small stove (not shown) could now be placed in the shelter and it is ready for use. It can be seen that the side of the shelter extends outwardly from platform 11, thus providing access to the fishing holes previously referred to.

It will be apparent to these skilled in the art that various changes and modifications may be made in the embodiments described in the appended claims. It is intended, therefore, that all matter contained in the foregoing description and in the drawings shall be interpreted as illustrative only and not as limitative of the invention.

I claim:

1. In a collapsible shelter for ice fishing having a sled mounted floor section the combination of; a first frame section having the bottom edge thereof in hinged connection with one edge of the sled floor; a second frame section having one edge in hinged connection with the top edge of the said first frame section; a third frame section in hinged connection with the opposite end of the said second frame section; a lower extension means extending outwardly from one side of the sled floor and having an opening therein; top extension means coextensive with said lower extension means and extending outwardly from the said second frame section; and a flexible covering enveloping the outside of the structure aforesaid.

2. The device defined in claim 1 wherein the *first* frame section is provided with a door in hinged relation therewith and having a windproof cover.

3. The device defined in claim 1 wherein the lower extension means comprises a pair of retractable arms in spaced relation to each other and a lower side bar extending between the outermost ends of said arms and fastened respectively thereto.

4. The device of claim 1 wherein the top extension means comprises a pair of spaced arms in pivoted connection with the second frame section and a top side bar extending between the outermost ends of said arms and fastened respectively thereto.

5. A foldable and portable ice fishing shelter comprising a sled having a floor; sides extending upwardly from three edges of said floor; a pair of spaced extension arms extendable from the open edge of said floor and individually contiguous to a corresponding side; a lower side bar disposed between the outermost ends of said extension arms; expandible means connecting the lower side bar ends to the respective extension arm ends; a door frame section in hinged connection with one sled side and swingable from a horizontal to a vertical position, said door frame section having a door in hinged relation therewith; a roof frame section having one end in hinged connection with the top of the door frame section; a pair of spaced top arms pivotally connected respectively to opposite ends of said roof frame section and positionable so as to be coextensive with the extension arms aforesaid; a top side bar extending between the outermost ends of said pair of top arms and in pinned connection therewith; latching means for holding said top arms in extended position; a wall frame section in hinged connection with the roof frame section; and a flexible cover covering the structure aforesaid.

6. The device of claim 5 wherein the expandible means comprises a strip of elastomeric material.

7. The device of claim 5 wherein the expandible means comprises a spring.

8. The device of claim 5 in which the latching means comprises a Z shaped wire pivotally engaged in said spaced arms and engageable with the said roof frame section.

*9. A foldable and portable ice fishing shelter comprising a sled; a first frame section having the bottom edge thereof in hinged connection with the sled, a second frame section having one edge in hinged connection with the top edge of the said first frame section; a third frame section in hinged connection with one of said second frame section and said sled and having a freely releasable engagement with the other of said second frame section and said sled for selective free movement with respect thereto, said first, second and third frame sections being rigid over their respective extents and foldable on said hinge con-*

*nections as rigid frame sections to nest on said sled; and a flexible covering enveloping the outside of the structure aforesaid.*

*10. A foldable and portable ice fishing shelter comprising a sled; a first frame section having the bottom edge thereof in hinged connection with the sled, a second frame section having one edge in hinged connection with the top edge of the said first frame section; a third frame section in hinged connection with one of said second frame section and said sled and having a freely releasable engagement with the other of said frame section and said sled for selective free movement with respect thereto; a lower extension means having an opening therein; means supporting said lower extension means from said sled for movement, when said frame sections are extended, with respect to said sled between a first position extending outwardly from one side of said sled and a second position nested within said sled; and a flexible covering enveloping the outside of the structure aforesaid.*

*11. The combination of claim 10 wherein said third frame section is hingedly connected to said second frame section and has a freely releasable engagement with said sled.*

References Cited by the Examiner

The following references, cited by the Examiner, are of record in the patented file of this patent or the original patent.

UNITED STATES PATENTS

| | | | |
|---|---|---|---|
| 410,783 | 9/1889 | Chadd | 135—4 X |
| 1,407,040 | 2/1922 | Myers | 135—4 |
| 1,828,642 | 10/1931 | Bunker | 52—70 |
| 2,473,076 | 6/1949 | Scheibner | 135—4 X |
| 2,523,533 | 9/1950 | Hurwitz et al. | 135—4 X |
| 2,717,160 | 9/1955 | Schmidt et al. | 135—4 |
| 2,912,703 | 11/1959 | Murphy | 135—7.1 X |
| 3,018,782 | 1/1962 | Hershberger | 135—1 |
| 3,027,189 | 3/1962 | Scott | 135—3 X |

FOREIGN PATENTS

| | | |
|---|---|---|
| 798,110 | 3/1936 | France. |
| 351,072 | 8/1937 | Italy. |

HARRISON R. MOSELEY, *Primary Examiner.*

A. I. BREIER, *Assistant Examiner.*